US010280784B2

(12) United States Patent
McCaffrey

(10) Patent No.: US 10,280,784 B2
(45) Date of Patent: May 7, 2019

(54) ADJUSTABLE BLADE OUTER AIR SEAL APPARATUS

(71) Applicant: United Technologies Corporation, Hartford, CT (US)

(72) Inventor: Michael G. McCaffrey, Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 684 days.

(21) Appl. No.: 14/749,695

(22) Filed: Jun. 25, 2015

(65) Prior Publication Data

US 2016/0032754 A1 Feb. 4, 2016

Related U.S. Application Data

(63) Continuation of application No. 13/396,016, filed on Feb. 14, 2012, now Pat. No. 9,228,447.

(51) Int. Cl.
*F01D 11/20* (2006.01)
*F01D 11/22* (2006.01)
(Continued)

(52) U.S. Cl.
CPC .............. *F01D 11/20* (2013.01); *F01D 11/22* (2013.01); *F01D 25/24* (2013.01); *F02C 3/04* (2013.01); *F02C 7/28* (2013.01); *F05D 2220/32* (2013.01); *F05D 2240/11* (2013.01); *F05D 2240/35* (2013.01); *F05D 2240/55* (2013.01); *Y10T 29/49318* (2015.01)

(58) Field of Classification Search
CPC .......... F01D 11/20; F01D 25/24; F01D 11/22; F01D 11/025; F01D 11/001; F02C 3/04; F02C 7/28; F05D 2240/55; F05D 2240/35; F05D 2220/32; F05D 2240/11; F16J 15/445; F16J 15/442
See application file for complete search history.

(56) References Cited

U.S. PATENT DOCUMENTS 2,616,257 A 11/1952 Mock
2,947,364 A * 8/1960 Haworth ................ B64C 11/40 416/169 R
(Continued)

FOREIGN PATENT DOCUMENTS

EP 0806680 11/1997
EP 1741880 1/2007
(Continued)

OTHER PUBLICATIONS

Supplementary European Search Report for European Patent Application No. 13749712.9 completed Oct. 5, 2015.
(Continued)

*Primary Examiner* — Eldon Brockman
(74) *Attorney, Agent, or Firm* — Carlson, Gaskey & Olds, P.C.

(57) ABSTRACT

An adjustable blade outer air seal apparatus includes a case that extends circumferentially around an axis, a support ring non-rigidly mounted to the case on spring connections radially inwards of the case, whereby the support ring floats with respect to the case, and at least one blade outer air seal segment that is radially adjustable relative to the support ring.

16 Claims, 4 Drawing Sheets

(51) Int. Cl.

| | |
|---|---|
| ***F01D 25/24*** | (2006.01) |
| ***F02C 3/04*** | (2006.01) |
| ***F02C 7/28*** | (2006.01) |

(56) References Cited

U.S. PATENT DOCUMENTS

| | | | | | |
|---|---|---|---|---|---|
| 3,227,418 | A | | 1/1966 | West | |
| 4,330,234 | A | * | 5/1982 | Colley | F01D 11/005 415/127 |
| 4,334,822 | A | | 6/1982 | Rossmann | |
| 4,576,548 | A | * | 3/1986 | Smed | F01D 11/005 277/359 |
| 5,049,033 | A | | 8/1991 | Corsmeier et al. | |
| 5,056,988 | A | | 10/1991 | Corsmeier et al. | |
| 5,096,375 | A | | 3/1992 | Ciokailo | |
| 5,104,287 | A | * | 4/1992 | Ciokajlo | F01D 11/22 415/126 |
| 5,129,231 | A | | 7/1992 | Becker et al. | |
| 5,203,673 | A | | 4/1993 | Evans | |
| 5,253,471 | A | | 10/1993 | Richardson | |
| 5,307,637 | A | | 5/1994 | Stickles et al. | |
| 5,419,115 | A | | 5/1995 | Butler et al. | |
| 5,479,774 | A | | 1/1996 | Burnell et al. | |
| 5,623,827 | A | | 4/1997 | Monty | |
| 5,639,210 | A | * | 6/1997 | Carpenter | F01D 11/18 415/135 |
| 5,791,872 | A | | 8/1998 | Owen | |
| 5,818,242 | A | | 10/1998 | Grzybowski et al. | |
| 5,956,955 | A | | 9/1999 | Schmid | |
| 6,037,581 | A | | 3/2000 | Zorner | |
| 6,547,522 | B2 | * | 4/2003 | Turnquist | F01D 11/122 415/173.3 |
| 6,572,115 | B1 | * | 6/2003 | Sarshar | F16J 15/3288 277/412 |
| 6,786,487 | B2 | * | 9/2004 | Dinc | F01D 11/025 277/355 |
| 6,840,519 | B2 | * | 1/2005 | Dinc | F16J 15/445 277/303 |
| 6,997,673 | B2 | * | 2/2006 | Morris | F01D 9/04 415/1 |
| 7,079,957 | B2 | | 7/2006 | Finnigan et al. | |
| 7,207,769 | B2 | | 4/2007 | Tanioka | |
| 7,229,246 | B2 | * | 6/2007 | Ghasripoor | F04D 29/126 277/413 |
| 7,259,552 | B2 | | 8/2007 | Twerdochlib | |
| 7,435,049 | B2 | * | 10/2008 | Ghasripoor | F01D 5/225 277/415 |
| 7,625,169 | B2 | | 12/2009 | Manzoori | |
| 7,694,505 | B2 | | 4/2010 | Schilling | |
| 7,704,041 | B2 | * | 4/2010 | Adis | F01D 11/003 277/413 |
| 7,748,945 | B2 | * | 7/2010 | Johnson | F01D 11/001 415/1 |
| 8,011,883 | B2 | | 9/2011 | Schwarz et al. | |
| 8,162,324 | B2 | * | 4/2012 | Deo | F01D 11/003 277/413 |
| 8,177,483 | B2 | | 5/2012 | McCallum | |
| 8,475,110 | B2 | | 7/2013 | Hefner et al. | |
| 8,558,538 | B2 | | 10/2013 | Phillips et al. | |
| 8,608,427 | B2 | * | 12/2013 | Bock | F01D 11/22 415/118 |
| 8,636,464 | B2 | * | 1/2014 | Bottome | F01D 11/08 415/128 |
| 8,678,742 | B2 | * | 3/2014 | Klingels | F01D 11/22 415/1 |
| 8,721,270 | B2 | * | 5/2014 | Graefe | F01D 11/22 415/174.1 |
| 8,944,756 | B2 | * | 2/2015 | Lagueux | F01D 11/08 415/113 |
| 2006/0042257 | A1 | | 3/2006 | Stastny | |
| 2006/0067815 | A1 | * | 3/2006 | Ghasripoor | F04D 29/126 415/170.1 |
| 2006/0140754 | A1 | | 6/2006 | Tanioka | |
| 2007/0082530 | A1 | | 4/2007 | Burd | |
| 2009/0128166 | A1 | | 8/2009 | Webster | |
| 2009/0208322 | A1 | * | 8/2009 | McCaffrey | F01D 11/125 415/113 |
| 2010/0078893 | A1 | * | 4/2010 | Turnquist | F01D 11/025 277/303 |
| 2010/0209231 | A1 | | 8/2010 | Lewis | |
| 2010/0303612 | A1 | | 12/2010 | Bhatnagar et al. | |
| 2011/0044801 | A1 | | 2/2011 | DiPaola et al. | |
| 2011/0044803 | A1 | | 2/2011 | Di Paola et al. | |
| 2012/0057958 | A1 | | 3/2012 | Klingels | |
| 2013/0017057 | A1 | * | 1/2013 | Lagueux | F01D 11/22 415/1 |

FOREIGN PATENT DOCUMENTS

| | | |
|---|---|---|
| EP | 2090754 | 8/2009 |
| GB | 2042646 | 9/1980 |
| GB | 2240818 | 8/1991 |
| WO | 2009130262 | 10/2009 |

OTHER PUBLICATIONS

Singapore Search Report regarding Singapore Application No. 11201404091V dated Jul. 29, 2015.

Gunston: "Jane's Aero-Engines," Pratt & Whitney/USA, Mar. 2000, JAEng—Issue 7, Copyright 2000 by Jane's Information Group Limited, pp. 510-512.

* cited by examiner

ADJUSTABLE BLADE OUTER AIR SEAL APPARATUS

CROSS REFERENCE TO RELATED APPLICATION

This application is a continuation of U.S. patent application Ser. No. 13/396,016, filed Feb. 14, 2012.

BACKGROUND

This disclosure relates to blade outer air seals and, more particularly, to adjustable blade outer air seals.

Compressor sections and turbine sections of gas turbine engines typically include one or more stages of static vanes and rotating blades. A casing is typically provided circumferentially around the stages and a shroud inside of the casing provides a relatively tight clearance with tips of the rotating blades to reduce gas leakage. In some examples, a tip clearance control mechanism adjusts the radial position of the shroud. Typically, the shroud is indirectly moved by moving the case or other support structure, for example, which inhibits the ability to move the shroud quickly and precisely.

SUMMARY

An adjustable blade outer air seal apparatus according to an example of the present disclosure includes a case extending circumferentially around an axis, and a support ring non-rigidly mounted to the case on spring connections radially inwards of the case, whereby the support ring radially floats with respect to the case. At least one blade outer air seal segment is radially adjustable relative to the support ring.

In a further embodiment of any of the foregoing embodiments, the spring connections bias the support ring to a centered position with respect to the case.

In a further embodiment of any of the foregoing embodiments, at least one blade outer air seal segment includes a lower body portion that has a leading end and a trailing end, circumferential sides, and a radially inner gas path surface and an opposed radially outer surface, with a shaft that extends radially outwards from the radially outer surface and through an unthreaded opening in the support ring structure such that a threaded end of the shaft projects from an outer surface of the support ring structure.

In a further embodiment of any of the foregoing embodiments, the shaft includes an internal cavity.

A further embodiment of any of the foregoing embodiments includes an actuation arm that engages the threaded end.

A further embodiment of any of the foregoing embodiments includes a clamp secured on the threaded end such that the actuation arm is secured between the clamp and the support ring structure.

A further embodiment of any of the foregoing embodiments includes a thrust plate between the actuation arm and the support ring structure.

A further embodiment of any of the foregoing embodiments includes a spacer mounted adjacent the support ring structure. The spacer is adjustable in radial size. The radial size controls a radial position of the at least one blade outer air seal segment relative to the support ring.

In a further embodiment of any of the foregoing embodiments, the spacer includes a variable number of stacked washers that define the radial size of the spacer.

In a further embodiment of any of the foregoing embodiments, the at least one blade outer air seal segment and the support ring structure include an anti-rotation feature limiting rotation of the at least one blade outer air seal segment about a radial axis, the anti-rotation feature including a slot and a tab received in the slot, and the tab and the slot are located at a leading end or a trailing end of the at least one blade outer air seal segment.

A gas turbine engine according to an example of the present disclosure includes a compressor section, a combustor section, and a turbine section. At least one of the compressor section and the turbine section include an adjustable blade outer air seal apparatus comprising a case structure extending circumferentially about an engine central axis. A support ring is non-rigidly mounted to the case on spring connections radially inwards of the case, whereby the support ring radially floats with respect to the case. At least one blade outer air seal segment is radially adjustable relative to the support ring.

A further embodiment of any of the foregoing embodiments includes a fan and a gear assembly. The fan is rotatably coupled to the turbine section through the gear assembly.

In a further embodiment of any of the foregoing embodiments, the spring connections bias the support ring to a centered position with respect to the case.

A further embodiment of any of the foregoing embodiments includes a spacer mounted adjacent the support ring structure. The spacer is adjustable in radial size. The radial size controls a radial position of the at least one blade outer air seal segment relative to the support ring.

In a further embodiment of any of the foregoing embodiments, the spacer includes a variable number of stacked washers that define the radial size of the spacer.

A method for adjusting position of a blade outer air seal according to an example of the present disclosure includes setting a starting radial position of a blade outer air seal to obtain a desired starting clearance between the blade outer air seal and a rotatable blade. The setting includes adjusting a radial size of an adjustable spacer and, after the setting, in response to one or more flight conditions, using an actuation arm for fine adjustment control of the radial position of the blade outer air seal.

In a further embodiment of any of the foregoing embodiments, the fine adjustment control includes changing the radial position in an increment of approximately 0.001 inches.

In a further embodiment of any of the foregoing embodiments, the adjustable spacer includes a variable number of stacked washers that define the radial size of the spacer, and the setting includes selecting the number of the stacked washers to use.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
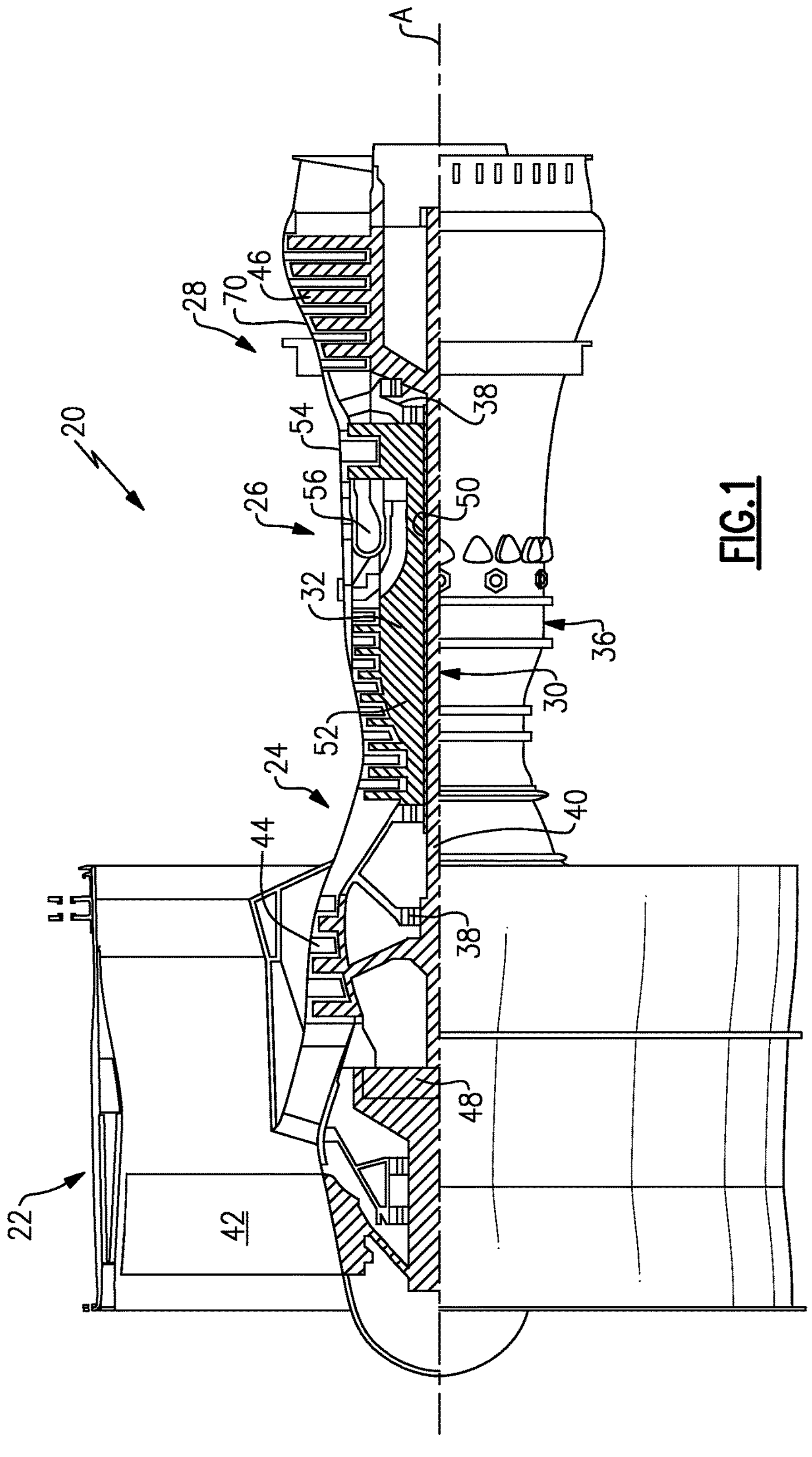
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a gear assembly 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than ten (10), the gear assembly 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The gear assembly 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
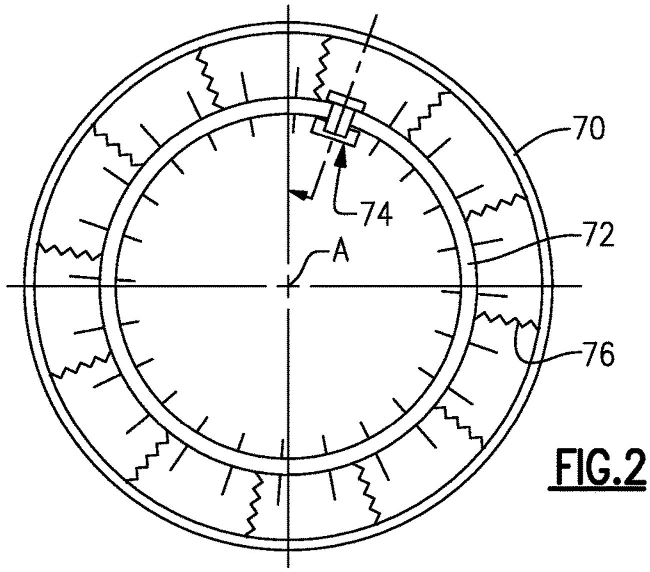
FIG. 2 illustrates a cross-section through selected portions of a gas turbine engine.

FIG. 2 schematically illustrates a cross-section through the turbine section 28 of the engine 20, although the examples herein are also understood to be applicable to the compressor section 24 or other rotatable machinery. As shown, the engine 20 includes a case structure 70 that extends generally circumferentially around the axis A of the engine 20. A support ring structure 72 is mounted radially inwards of the case structure 70 with regard to the axis A. As further shown, at least one blade outer air seal segment 74 (one shown) is mounted relative to the support ring structure 72. It is to be understood that a plurality of blade outer air seal segments 74 may be provided to form a complete annular shroud around central axis A. As will be described in more detail below, the at least one blade outer air seal segment 74 is radially adjustable relative to the support ring structure 72, which provides the ability to directly adjust the radial position of the blade outer air seal segment 74 without having to indirectly adjust the position by moving the case structure 70 and/or support ring structure 72.

In the example non-limiting embodiment, the support ring structure 72 is "floating" with regard to the case structure 70. That is, the support ring structure 72 is non-rigidly connected with the case structure 70 using spring connections 76. The spring connections 76 serve to center the support ring structure 72 relative to the case structure 70 and axis A. Thus, under certain load conditions, the support ring structure 72 is permitted to move relative to the case structure 70. Due at least in part to the "floating" design of the support ring structure 72 and case structure 70, the blade outer air seal segments 74 are radially adjustable relative to the support ring structure 72 and are not rigidly affixed relative to the case structure 70. Although this embodiment includes the "floating" arrangement, it is to be understood that other embodiments and the disclosed examples disclosed are not limited to a "floating" arrangement.

Figure 3:
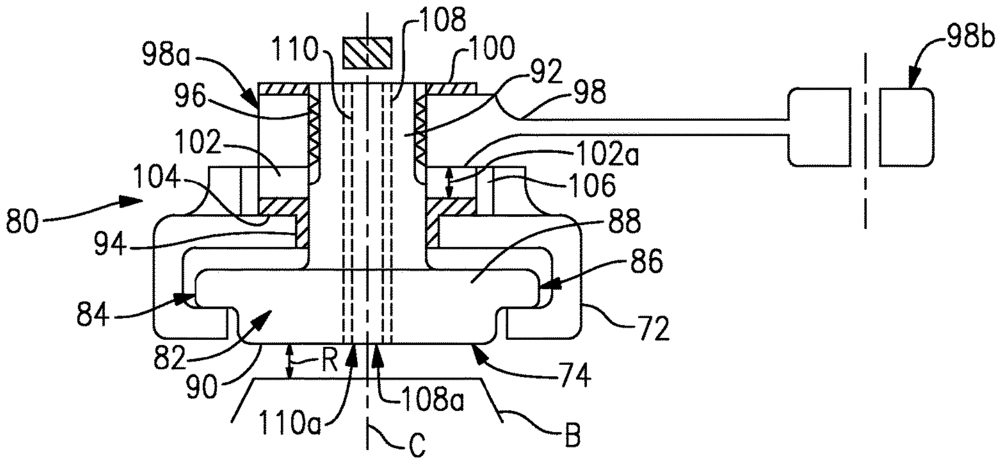
FIG. 3 illustrates an example adjustable blade outer air seal apparatus.

FIG. 3 shows an example adjustable blade outer air seal apparatus 80 that incorporates the blade outer air seal segment 74. In this example, the blade outer air seal segment 74 includes a lower body portion 82 that generally extends between a leading end 84 and a trailing end 86, circumferential sides 88 (one shown) and a radially inner seal surface 90. The seal surface 90 is a gas path surface that faces in a direction toward rotating blade B.

In this example, the blade outer air seal segment 74 includes a threaded shaft 92 that extends radially outwardly from the lower body portion 82. The threaded shaft 92 extends through an unthreaded opening 94 in the support ring structure 72. A threaded portion 96 on the periphery of the upper part of the threaded shaft 92 threadingly engages an actuation arm 98. The actuation arm 98 extends between a first end 98*a*, which is threadingly engaged with the threaded portion 96 of the threaded shaft 92, and a second end 98*b* that is used to rotate the actuation arm 98 relative to radial axis C.

In the illustrated embodiment, the first end 98*a* of the actuation arm 98 is secured between a clamp member 100 and a radially outer surface of the support ring structure 72. Optionally, an adjustable spacer 102, seal bushing 104 and thrust plate 106 are provided between the first end 98*a* of the actuation arm 98 and the radially outer surface of the support ring structure 72.

In operation, the actuation arm 98 is rotated about radial axis C, which is generally perpendicular to axis A. The clamp member 100 limits movement of the actuation arm 98 such that the threaded engagement between the first end 98*a* of the actuation arm 98 and the threaded portion 96 of the threaded shaft 92 causes the blade outer air seal segment 74 to move radially. As an example, an actuation mechanism (not shown) is mechanically connected with the second end 98*b* to rotate the actuation arm 98 an appropriate amount to change the radial position of the blade outer air seal segment 74. In one example, each actuation arm 98 of each blade outer air seal 74 includes a dedicated actuator, such as a motor. Alternatively, the actuation arms 98 are coupled to a common actuator through a unison ring, for example.

In a further example, a thread pitch of the threaded portion 96 of the threaded shaft 92 is selected such that for a given angular rotation of the actuation arm 98, the blade outer air seal segment 74 moves a predetermined amount in a radial direction along axis C. In a further embodiment, the thread pitch is 28 threads per inch (11 threads per centimeter) such that approximately 10° rotation of the actuation arm 98 causes a radial position change of the blade outer air seal segment 74 of approximately 0.001 inches (0.00254 centimeters). Thus, the adjustable blade outer air seal apparatus 80 provides fine control of the radial position of the seal surface 90. Given this description, one of ordinary skill in the art will recognize other suitable thread pitches to meet their particular needs. Put another way, if greater or lesser angular rotation is desired of the actuation arm 98, a different thread pitch can be used. However, using a relatively fine pitch allows for very small and precise movement of the blade outer air seal segment 74 in order to adjust a radial distance R between the seal surface 90 of the blade outer air seal segment 74 and a tip of the rotating or rotatable blade B.

In a further example, the position of the blade outer air seal segment 74 is radially adjusted in response to at least one of an aircraft maneuver and a detected engine temperature. As an example, an aircraft maneuver, such as a change in aircraft pitch, can cause the engine 20 to deflect. To limit rub between the blade outer air seals 74 and the blades B, the aircraft maneuver causes a control signal to be sent to the actuator or actuators to radially retract the blade out air seals 74. By limiting rub during such aircraft maneuvers, the lifetime of the blade outer air seals 74 is extended. In another example, a detected change temperature can cause thermal expansion or contraction in portions of the engine 20. In response to a detected change in temperature or predetermined temperature threshold, a control signal is sent to the actuator or actuators to radially move the blade out air seals 74.

In a further example, because the blade outer air seals 74 are directly mechanically moved instead of moving the case structure 70 or support ring structure 72 to indirectly move the blade outer air seals 74, the adjustable blade outer air seal apparatus 80 is able to rapidly respond to a signal to move. In one example, the blade outer air seals 74 are radially adjusted in a response time of less than one second between initiating a control signal to move and movement between radial positions.

In a further example where the adjustable spacer 102 is used, the adjustable spacer 102 is used to initially set the radial position of the blade outer air seal segment 74. As shown, the adjustable spacer 102 has a radial dimension 102*a* that is adjustable to control an initial radial position of the blade outer air seal segment 74 relative to the support ring structure 72. That is, for a selected relatively smaller radial dimension 102*a*, the initial position of the blade outer air seal segment 74 is relatively closer to axis A in along radial axis C. For a selected relatively larger radial dimension 102*a*, the radial position of the blade outer air seal segment 74 is relatively farther from axis A along radial axis C.

In a further embodiment, the adjustable spacer 102 is a stacked washer system. For example, greater or fewer number of washers are provided in the stack to adjust the radial dimension 102*a* of the adjustable spacer 102 to set an initial radial position of the blade outer air seal segment 74. In this manner, a user initially sets a desirable clearance R between the seal surface 90 and the tip of the rotating blade B and thereafter finely adjusts the clearance R using the actuation arm 98. In another alternative, the adjustable spacer 102 is a shim that has predetermined radial dimension 102*a* to set a desired initial radial position of the blade outer air seal segment 74.

In a further example where the thrust plate 106 and bushing 104 are used, the bushing 104 provides an air seal between the unthreaded opening 94 in the support ring structure 72 and the gas path surface provided by the seal surface 90. Further, as the gas flowing over the blade B varies in pressure, the pressure variations are reacted through the blade outer air seal segment 74 into the thrust plate 106. Thus, the thrust plate 106 facilitates load management in the adjustable blade outer air seal apparatus 80.

In a further embodiment, the blade outer air seal segment 74 optionally includes a cavity 108 that extends through the threaded shaft 92 and lower body portion 82. In this example, the cavity 108 includes an end 108*a* that opens at the seal surface 90 of the blade outer air seal segment 74. In a further example, a sensor probe 110 is received at least partially within the cavity 108. The sensor probe 110 facilitates determining the clearance R. For example, the sensor probe 110 includes an end 110*a* that is flush with the seal surface 90 at the open end 108*a* of the cavity 108 and the radial axis C along which the cavity 108 extends is centered with regard to the lower body portion 82 in order to gauge the blade outer air seal 74 position at the center. The sensor probe 110 is a laser sensor, microwave sensor, or other suitable type of sensor for use within a gas turbine engine environment.

Figure 4:
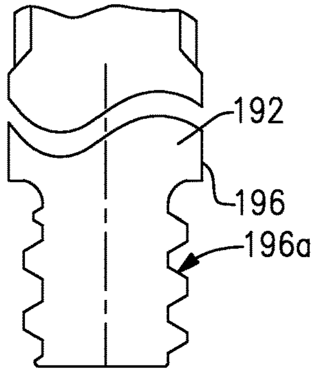
FIG. 4 illustrates an example threaded shaft of an adjustable blade outer air seal apparatus.

Referring to FIG. 4, a portion of another example threaded shaft 192 is shown. In this disclosure, like reference numerals designate like elements where appropriate and reference numerals with the addition of one-hundred or multiples thereof designate modified elements that are understood to incorporate the same features and benefits of the corresponding elements. The threaded shaft 192 shown in FIG. 4 may be used in place of the threaded shaft 92 as shown in FIG. 3. In this example, however, the threaded portion 196 of the threaded shaft 192 includes trapezoidal threads 196*a*, also known as acme threads. As an example, the trapezoidal threads 196*a* provide a high strength threaded connection between the threaded shaft 192 and the actuation arm 98.

Figure 5:
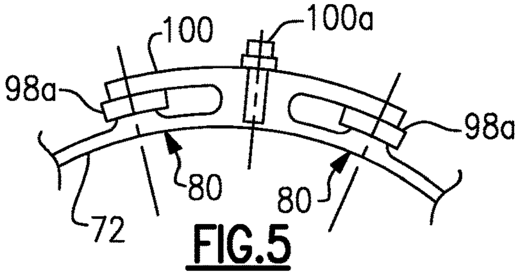
FIG. 5 illustrates a clamp of an adjustable blade outer air seal apparatus.
Figure 6:
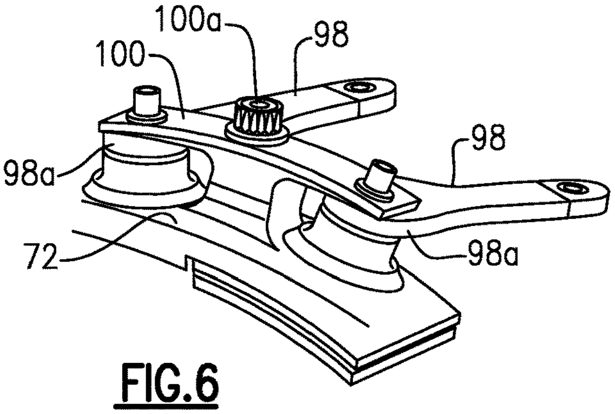
FIG. 6 illustrates a perspective view of the clamp of FIG. 5.

FIGS. 5 and 6 schematically show selected portions of two neighboring adjustable blade outer air seal apparatuses 80, as previously described. In the drawing, only the support ring structure 72, first end 98*a* of the actuation arm 98 and clamp member 100 are shown. In this example, the cross-section is taken perpendicular to axis A to show the clamp member 100. The clamp member 100 in this example is common between the neighboring adjustable blade outer air seal apparatuses 80. That is, the clamp member 100 extends between at least two actuation arms 98 to clamp the respective first ends 98*a* onto the support ring structure 72. The common clamp member 100 is rigidly secured directly to the support ring structure 72 using fastener 100*a*. Although the common clamp member 100 is shown as securing two actuator arms 98 in this example, it is to be understood that the clamp member 100 can alternatively be adapted to clamp a single actuation arm 98 or greater than two actuation arms 98 in other examples.

Figure 7:
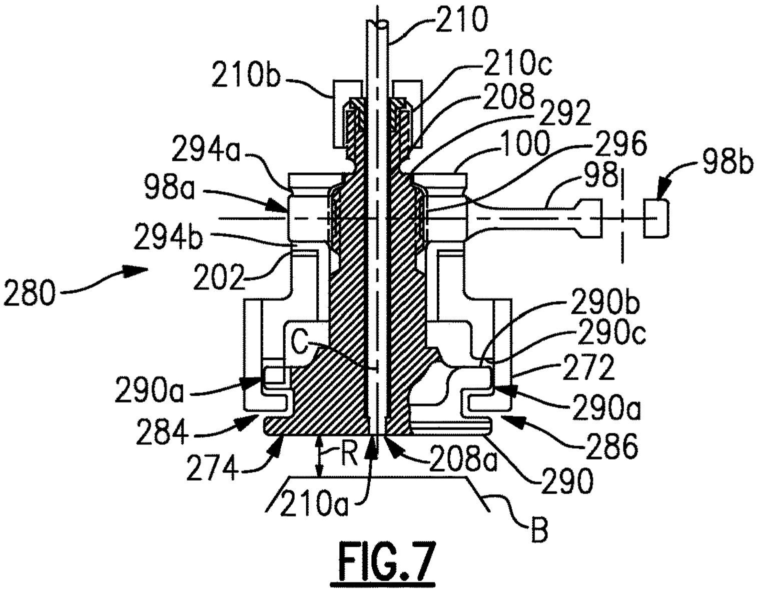
FIG. 7 illustrates another example adjustable blade outer air seal apparatus.

FIG. 7 shows another example adjustable blade outer air seal apparatus 280 that is somewhat similar to the adjustable blade outer air seal apparatus 80 as described with reference to FIG. 3. In this example, the blade outer air seal segment 74 and the threaded shaft 292 are integrally formed as a single, monolithic structure with the cavity 208 extending there through to end 208*a* that is flush with a seal surface 290 of the blade outer air seal segment 274. A sensor probe 210 is located at least partially within the cavity 208 such that an end 210*a* of the sensor probe 210 is flush with the seal surface 290. In this example, a retaining nut 210*b* secures the sensor probe 210 relative to the blade outer air seal segment 274. In this regard, a threaded interface 210*c* is provided between the retainer nut 210*b* and the upper portion of the threaded shaft 292.

In this example, the adjustable blade outer air seal apparatus 280 includes an upper bushing 294*a* located between the first and 98*a* of the actuation arm 98 and clamp member 100, and a lower bushing 294*b* between the first end 98*a* of the actuation arm 98 and the support ring structure 272. Further, an adjustable spacer 202 in this example is located between the lower bushing 294*b* and the support ring structure 272. Alternatively, the adjustable spacer 202 is provided over the lower bushing 294*b* and between the lower bushing 294*b* and the first end 98*a* of the actuation arm 98.

In a further embodiment, the support ring structure 272 and blade outer air seal segment 274 are additionally provided with an anti-rotation feature 290*a* located the leading end 284, the trailing end 286 or both. In this example, the anti-rotation feature 290*a* includes a tab 290*b* extending circumferentially and a slot 290*c* that inter-fit to limit rotational movement about radial axis C. In the example shown, the tab 290*b* is provided on the blade outer air seal segment 274 and a slot 290*c* is provided in the support ring structure 272, however, it is to be understood that the tab 290*b* can alternatively be provided on the support ring structure 272 and a slot 290*c* on the blade outer air seal segment 274.

Figure 8:
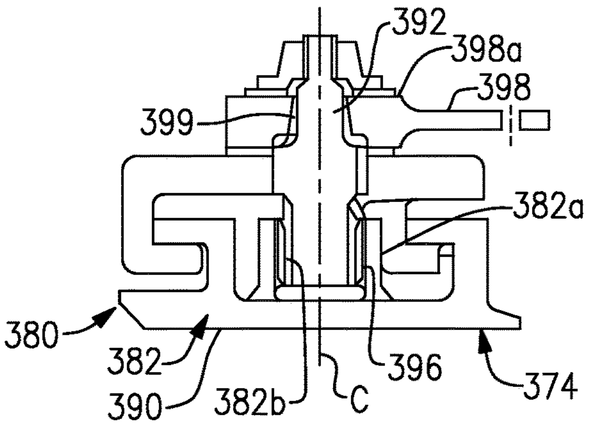
FIG. 8 illustrates another adjustable blade outer air seal apparatus.

FIG. 8 illustrates another embodiment of an adjustable blade air seal apparatus 380. In this example, the threaded shaft 392 and the lower body portion 382 of the blade outer air seal segment 374 are non-integral. In this regard, the lower body portion 382 of the blade outer air seal segment 74 includes a boss 382*a* for connection with the threaded shaft 392. In one example, the boss 382*a* is integrally formed with the lower body portion 382. Alternatively, the boss 382*a* is a separate piece that is affixed, such as by welding, to the lower body portion 382. In this example, the threaded portion 396 of the threaded shaft 392 is received into the boss 382*a* and engages a corresponding threaded portion 382*b* of the boss 382*a*. Rotation of the threaded shaft 392 thereby causes movement of the lower body portion 382.

Because the threaded portion 396 in this example engages the boss 382*a*, there is not a threaded connection between the first end 398*a* of actuation arm 398. Instead, in this example, a splined connection 399 is provided between the first end 398*a* and an upper portion of the threaded shaft 392. The splined connection 399 allows the first end 398*a* of the actuation arm 398 to be slid onto the threaded shaft 392 and rotate the shaft with regard to axis C. The rotation of the threaded shaft 392 moves the lower body portion 382 of the blade outer air seal segment 374 through the threaded engagement with the boss 382*a*.

Figure 9A:
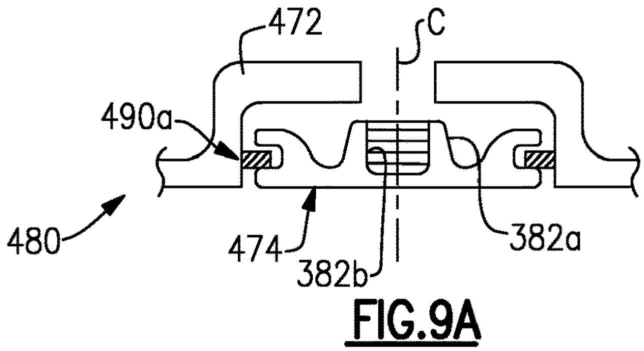
FIG. 9A illustrates an example blade outer air seal apparatus in a compressor section of a gas turbine engine.
Figure 9B:
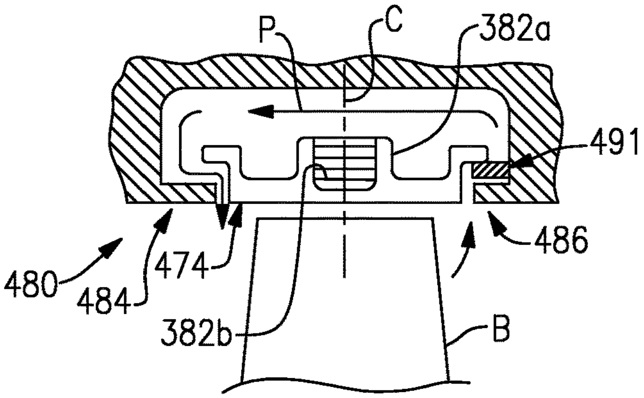
FIG. 9B illustrates another cross-section of the adjustable blade outer air seal apparatus of FIG. 9A.

FIGS. 9A and 9B illustrate cross-sections of selected portions of another example adjustable blade outer air seal apparatus 480 used in the compressor section 24. In the drawing, the threaded shaft 392 and connection with the actuation arm 398, as described with reference to FIG. 8, are not shown. The blade outer air seal segment 474 and support ring structure 472 include a seal 491. The seal 491 limits gas leakage around the blade outer air seal segment 474 through cavity P from the trailing end 486 back to the leading end 484. Thus, in operation, the seal limits flow of relatively higher pressure gas that is already passed over the blade B around the blade outer air seal segment 474 back to an upstream position at the leading end 484.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An adjustable blade outer air seal apparatus, comprising:

a case extending circumferentially around an axis;

a support ring non-rigidly mounted to the case on spring connections radially inwards of the case, whereby the support ring radially floats with respect to the case; and at least one blade outer air seal segment that is radially adjustable relative to the support ring;

wherein the at least one blade outer air seal segment includes a lower body portion that has a leading end and a trailing end, circumferential sides, and a radially inner gas path surface and an opposed radially outer surface, with a shaft that extends radially outwards from the radially outer surface and through an unthreaded opening in the support ring structure such that a threaded end of the shaft projects from an outer surface of the support ring structure.

2. The adjustable blade outer air seal apparatus as recited in claim 1, wherein the spring connections bias the support ring to a centered position with respect to the case.

3. The adjustable blade outer air seal apparatus as recited in claim 1, wherein the shaft includes an internal cavity.

4. The adjustable blade outer air seal apparatus as recited in claim 1, further comprising an actuation arm that engages the threaded end.

5. The adjustable blade outer air seal apparatus as recited in claim 4, further comprising a clamp secured on the threaded end such that the actuation arm is secured between the clamp and the support ring structure.

6. The adjustable blade outer air seal apparatus as recited in claim 5, further comprising a thrust plate between the actuation arm and the support ring structure.

7. The adjustable blade outer air seal apparatus as recited in claim 1, further comprising a spacer mounted adjacent the support ring structure, the spacer being adjustable in radial size, the radial size controlling a radial position of the at least one blade outer air seal segment relative to the support ring.

8. The adjustable blade outer air seal apparatus as recited in claim 7, wherein the spacer includes a variable number of stacked washers that define the radial size of the spacer.

9. The adjustable blade outer air seal apparatus as recited in claim 1, wherein the at least one blade outer air seal segment and the support ring structure include an anti-rotation feature limiting rotation of the at least one blade outer air seal segment about a radial axis, the anti-rotation feature including a slot and a tab received in the slot, and the tab and the slot are located at a leading end or a trailing end of the at least one blade outer air seal segment.

10. A gas turbine engine comprising:

a compressor section, a combustor section, and a turbine section, at least one of the compressor section and the turbine section including an adjustable blade outer air seal apparatus comprising a case structure extending circumferentially about an engine central axis, a support ring structure non-rigidly mounted on spring connections radially inwards of the case structure, whereby the support ring structure radially floats with respect to the case structure, and at least one blade outer air seal segment radially adjustably mounted relative to the support ring structure;

further comprising a spacer mounted adjacent the support ring structure, the spacer being adjustable in radial size, the radial size controlling a radial position of the at least one blade outer air seal segment relative to the support ring.

11. The gas turbine engine as recited in claim 10, further comprising a fan and a gear assembly, the fan being rotatably coupled to the turbine section through the gear assembly.

12. The gas turbine engine as recited in claim 10, wherein the spring connections bias the support ring to a centered position with respect to the case.

13. The gas turbine engine as recited in claim 10, wherein the spacer includes a variable number of stacked washers that define the radial size of the spacer.

14. A method for adjusting position of a blade outer air seal, the method comprising:

setting a starting radial position of a blade outer air seal to obtain a desired starting clearance between the blade outer air seal and a rotatable blade, the setting including adjusting a radial size of an adjustable spacer; and after the setting, in response to one or more flight conditions, using an actuation arm for fine adjustment control of the radial position of the blade outer air seal; wherein:

the blade outer air seal is in a blade outer air seal apparatus having a case structure extending circumferentially about an engine central axis, a support ring structure non-rigidly mounted on spring connections radially inwards of the case structure, whereby the support ring structure radially floats with respect to the case structure, and the blade outer air seal segment is radially adjustably mounted relative to the support ring structure.

15. The method as recited in claim 14, wherein the fine adjustment control includes changing the radial position in an increment of approximately 0.001 inches.

16. The method as recited in claim 14, wherein the adjustable spacer includes a variable number of stacked washers that define the radial size of the spacer, and the setting includes selecting the number of the stacked washers to use.

* * * * *